United States Patent [19]

Verhoeven

[11] Patent Number: 4,697,339
[45] Date of Patent: Oct. 6, 1987

[54] METHOD FOR THE PROCESSING OF A CABLE END AND CABLE CONNECTOR FOR CONNECTION TO THE CABLE

[75] Inventor: Laurentius M. Verhoeven, Veghel, Netherlands

[73] Assignee: E. I. Du Pont de Nemours and Company, Wilmington, Del.

[21] Appl. No.: 837,390

[22] Filed: Mar. 7, 1986

[30] Foreign Application Priority Data

Mar. 26, 1985 [NL] Netherlands ............... 8500885

[51] Int. Cl.⁴ ............................................. H01R 23/06
[52] U.S. Cl. ................................... 29/828; 439/610
[58] Field of Search ............... 339/14 R, 14 P, 177 R, 339/177 E, 143 R, 107; 29/828

[56] References Cited

U.S. PATENT DOCUMENTS

| | | | |
|---|---|---|---|
| 2,862,993 | 12/1958 | Schmidt | 174/75 |
| 3,517,375 | 6/1970 | Mancini | 339/177 R |
| 3,621,560 | 11/1971 | Bright | 29/828 |
| 4,368,576 | 1/1983 | Smit | 29/828 |
| 4,449,776 | 5/1984 | Carmo | 339/107 X |
| 4,449,778 | 5/1984 | Lane | 339/107 X |

FOREIGN PATENT DOCUMENTS 0083464  7/1983  European Pat. Off. .

Primary Examiner—Eugene F. Desmond

[57] ABSTRACT

This invention relates to a method for processing the end of cable having a screened, multicore of conductors provided with an outer sheath, and to a connector for the same. The cable is cut to provide an auxiliary sheath tube and an end sheath, both of which are utilized during process to expose and fold the screening. The signal conductors of the cable are connected to the insulated contact block of a connector. The ground terminal of the connector contacts the folded-over screening. The connector includes strain relief means.

7 Claims, 7 Drawing Figures

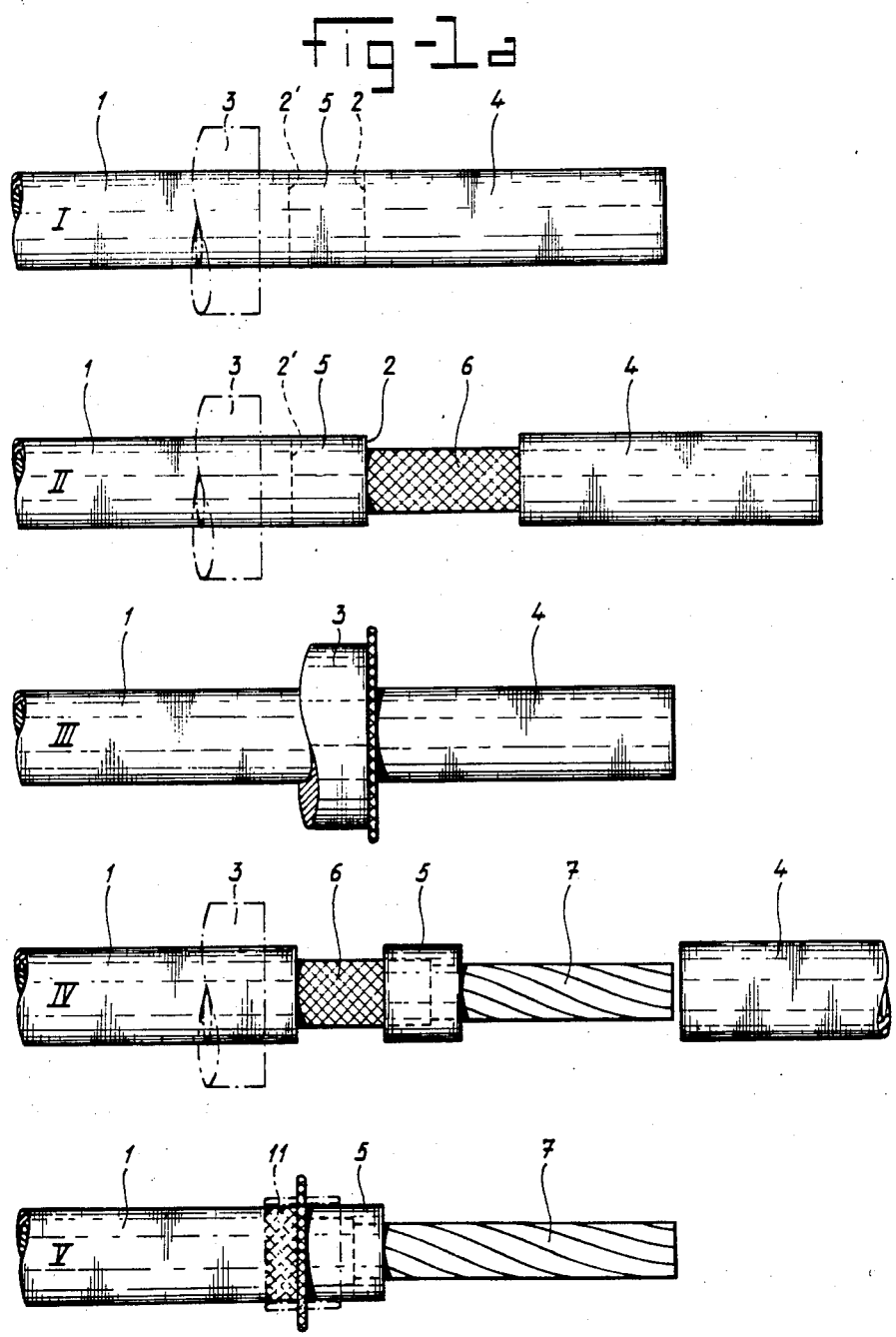

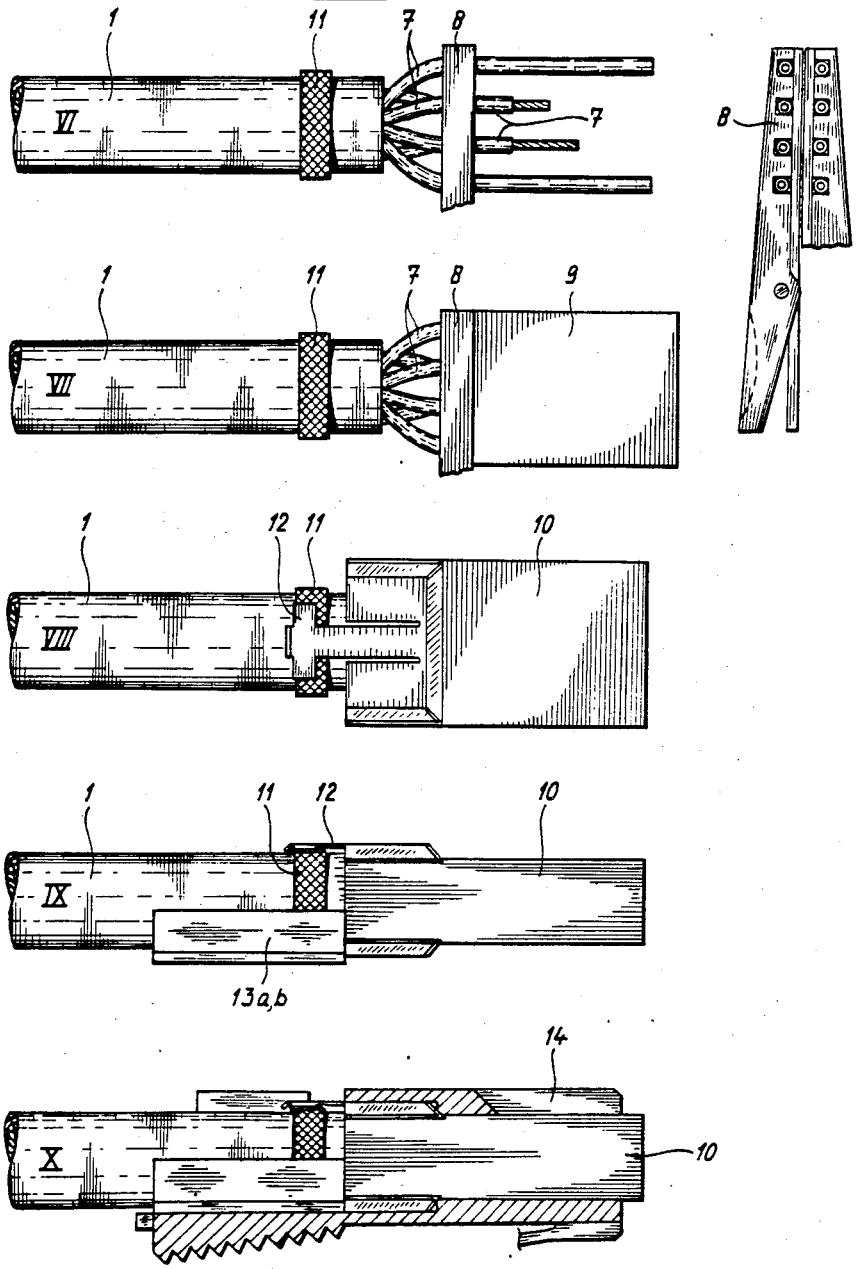

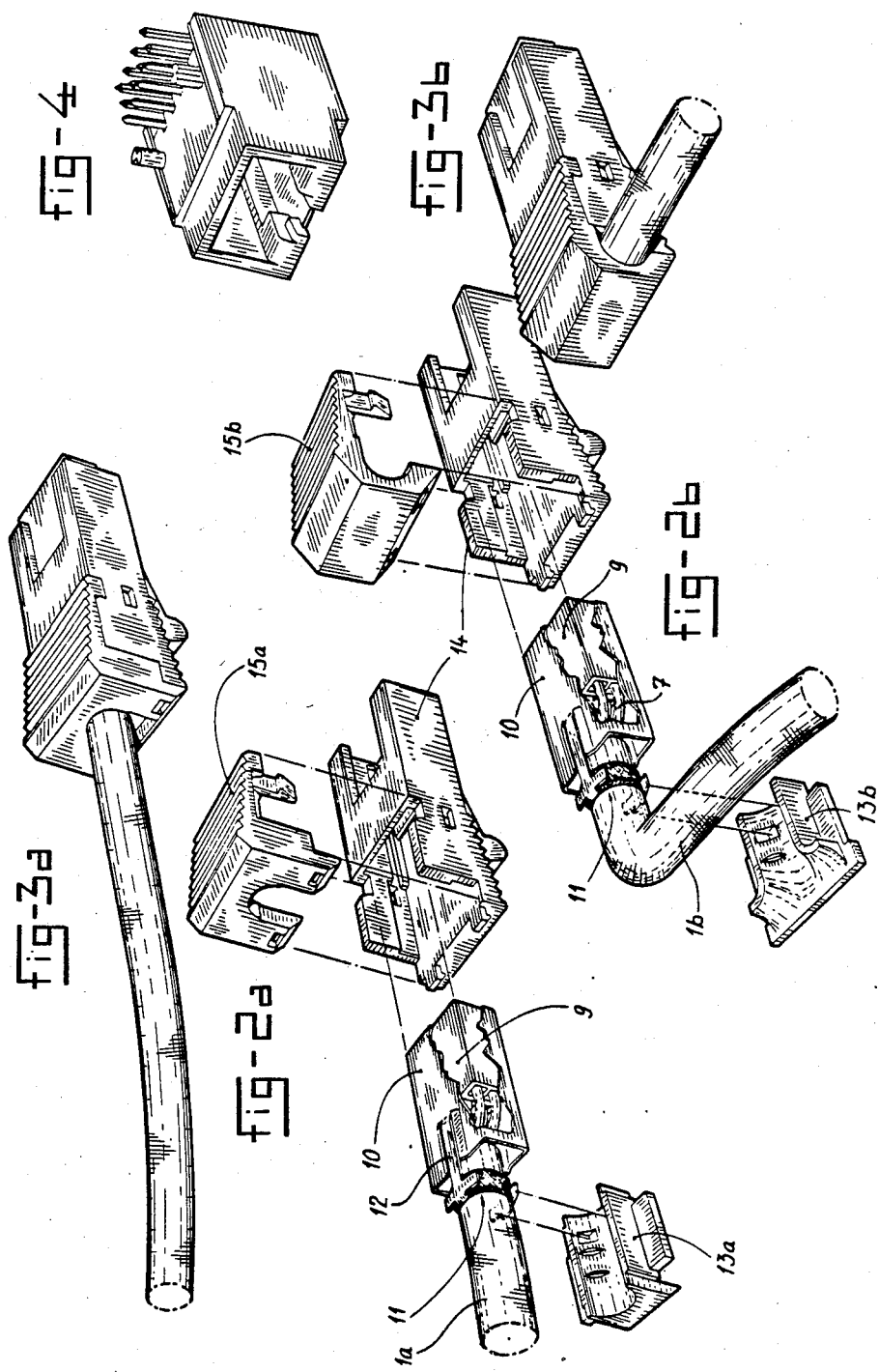

METHOD FOR THE PROCESSING OF A CABLE END AND CABLE CONNECTOR FOR CONNECTION TO THE CABLE

BACKGROUND OF THE INVENTION

The invention relates to cable connectors and to a method for the processing of the end of the cable, and more particularly to such processing of a screened, multicore round cable provided with an outer sheath, and the subsequent connection thereof to a connector.

Such multicore round cables are increasingly used as control cables between peripheral equipment and signal processors. In this connection, the structure of the round cable is such that a number of signal wires are at least jointly and possibly separately metal-screened. As a result, these signal wires are screened against outside influences or they cannot radiate outwards when pulsed signals are transmitted over these signal wires. Because the screening is of considerable importance in these cases, the processing of the extremity of such a cable, for example when connecting to a cable connector, is difficult. In practice even complicated tools and cumbersome method steps are used for this purpose.

SUMMARY OF THE INVENTION

The invention aims at providing as practical a method as possible for the processing of the end of a screened round cable and the subsequent connection of the latter to a cable connector. The method requires only a limited number of processing steps and simple tools. The costs are therefor relatively low.

The method of the present invention is achieved by means of the steps of:

a. cutting into the outer sheath of a cable all round down to the metallic screen along two circumferential lines spaced apart so as to form an auxiliary sheath tube therebetween, and also to form an end sheath tube toward the end of the cable;

b. sliding the end sheath tube aside for a distance and then sliding it back again with the screening so that the said screening bunches up, subsequently cutting off of the screening, and removing of the end sheath tube and the severed screening;

c. sliding the auxiliary sheath tube aside over the edge of the cut-off screening and sliding it back again along with the screening so that said screening bunches up, and subsequent folding of the screening all round over the auxiliary sheath tube; and d. stripping the insulation from the separate conductors, connecting the conductors to an insulated contact block of the connector, and contacting a ground terminal of the connector to the folded-over screening.

By means of the above method according to the invention, a very simple processing of a screened cable end is obtained, combined with a very effective cable relief and connection of the cable end to the connector and simultaneous contacting of the latter to the cable screening.

The connector according to the invention is provided with an insulating casing having a cable-relief clamp to be placed inside it and a metallic shielding sleeve fitted with a ground terminal, which sleeve is slid over the insulated contact block to be connected to the cable cores, and a cable clamping cover.

BRIEF DESCRIPTION OF THE DRAWINGS

The invention will be explained in more detail on the basis of an exemplary embodiment with reference to the drawings, in which;

FIGS. 1a and 1b show diagrammatically the ten steps, designated I to X, of the method according to the invention; and FIGS. 2a and 2b respectively show the connection to the cable connector specified in the steps VI to X of FIG. 1b via a rectilinearly terminating and laterally terminating cable end respectively;

FIGS. 3a and 3b show the connector of FIGS. 2a and 2b respectively in assembled form; and FIG. 4 shows a further connecting adaptor which can be plugged on to the connector of FIGS. 3a and 3b.

DESCRIPTION OF THE PREFERRED EMBODIMENTS

FIG. 1a illustrates the five steps I to V of the method of the present invention.

In step I, a support ring 3 is placed around the end 1 of a multicore, screened round cable as an auxiliary tool in the position diagrammatically indicated in the figure. Subsequently, with the aid of cutting means not specified, or shown, the plastic outer sheath of the round cable is cut into down to the screening first along a circumference 2 and then along a circumference 2'. In this process a severed end sheath tube 4 and a severed auxiliary sheath tube 5 are produced.

In step II, the severed end sheath tube 4 is slid aside over a distance towards the cable end so that a part of the metallic screen 6 is exposed, and the support ring is slid up.

In step III, the support ring 3 is positioned at the cut edge 2 and the severed end sheath tube is clamped. Subsequently, this end sheath tube is slid back along with the screening 6 so that the latter bunches up against the support ring as shown. The bunched-up screening is then cut off with the aid of cutting means.

In step IV, the end sheath tube is then removed along with the severed screening. The support ring 3 is also drawn back. The auxiliary sheath tube 5 is then slid aside towards the cable end over the edge of the severed screening so that the latter is smoothed out.

In step V, the auxiliary sheath tube is slid back to its original position and subsequently clamped. In this process the screening is bunched up and is then subsequently folded back 11 over the auxiliary sheath tube.

In FIG. 1b, the subsequent steps VI to X of the method are illustrated. These will be explained in conjunction with the connector in FIGS. 2a and 2b.

In step VI, the separate signal conductors or wire 7, exposed in the previous step, are selected and placed in sequence in a positioning clamp 8. The separate signal wires are then, if necessary, stripped of insulation and cut to length. The contacts are then fitted.

In step VII, the contacts are placed in an insulated contact block 9 of the connector with the aid of the positioning clamp. Contact blocks such as the PV TM' receptacles and Dubox TM receptacles sold commercially by the assignee of the present application can be employed for this purpose.

In step VIII, the positioning clamp 8 is removed and a metallic shielding sleeve 10 is fitted over the contact block 9 of the connector, during which process a ground terminal 12 of the shielding sleeve is brought into contact with the screening 11 of the cable.

In step IX, a strain relief clamp 13a, 13b is placed on the cable at the location of the folded-over screening 11. This clamp may have the embodiment shown in FIGS. 2a and 2b respectively for a rectilinearly terminating cable end 1a and a laterally terminating cable end 1b.

In step X, the insulating outer casing 14 of the connector is placed over the shielding sleeve 10, after which the cable clamping piece 15a, 15b (shown in FIGS. 2a, 2b) is pressed on and secures the cable.

FIGS. 3a and 3b show the final form of the connection of the cable to the connector according to FIGS. 2a and 2b.

FIG. 4 shows a connecting adaptor which can be plugged onto the connector shown in FIGS. 3a and 3b for further connection to electrical circuits or equipment.

It will be understood that the foregoing is merely illustrative of the principles of the invention and that various modifications can be made by those skilled in the art without departing from the scope and spirit of the invention.

I claim:

1. A method for the processing of the end of a screened, multicore round cable having an outer sheath and the connection of said cable end to a connector comprising the steps of
    a. cutting into the outer sheath all round down to the metallic screen along two circumferential lines spaced apart so that to form an auxiliary sheath tube therebetween, and also to form an end sheath tube towards the end of the cable;
    b. sliding the end sheath tube aside for a distance and then sliding it back again with the screening so that said screening bunches up, subsequently cutting off of the screening, and removing of the end sheath tube and the severed screening;
    c. sliding the auxiliary sheath tube aside over the edge of the cut-off screening and sliding it back again along with the screening so that said screening bunches up, and subsequent folding of the screening all round over the auxiliary sheath tube; and
    d. stripping the insulation from the separate conductors, connecting the conductors to an insulated contact block of the connector, and contacting a ground terminal of the connector to the folded-over screening.

2. The method according to claim 1, further comprising the additional steps of placing a support ring around the cable adjacent to circumferential lines to be cut, sliding up and securing of the support ring at one of the circumferential lines after the sliding aside the end sheath tube, and removing of the support ring after severing of the screening.

3. The method according to claim 2, further comprising the additional steps of clamping of the end sheath tube after it is slid aside for a distance, and clamping of the auxiliary sheath tube after it is slid aside over the edge of the severed screening.

4. The method according to claim 1, further comprising the additional steps of selecting of the separate conductors and the securing of said conductors in a positioning clamp of the connector.

5. The method according to claim 1, further comprising the additional steps of removing of the positioning clamp after the conductors have been connected to the insulated contact block, and placing of a metallic shielding tube of the connector, fitted with the ground terminal, over the insulated contact block.

6. The method according to claim 5, further comprising the additional step of placing of an insulating cable strain relief clamp of the connector over the cable at the position of the folded-over screening.

7. The method according to claim 5 further comprising the additional steps of placing of an insulating casing of the connector over the shielding tube and placing on said shielding tube a cable clamping cover of the connector.

* * * * *